United States Patent [19]

Maki

[11] Patent Number: 4,993,530
[45] Date of Patent: Feb. 19, 1991

[54] CLUTCH DISK ASSEMBLY WITH CONTINUOUSLY VARIABLE HYSTERESIS

[75] Inventor: Naoyuki Maki, Hazu, Japan

[73] Assignee: Aisin Seiki Kabushiki Kaisha, Kariya, Japan

[21] Appl. No.: 413,742

[22] Filed: Sep. 28, 1989

Related U.S. Application Data

[63] Continuation-in-part of Ser. No. 250,747, Sep. 29, 1988, Pat. No. 4,903,813.

[30] Foreign Application Priority Data

Sep. 29, 1988 [JP] Japan .................. 63-244761

[51] Int. Cl.⁵ .................................. F16D 3/14
[52] U.S. Cl. ...................... 192/106.2; 192/70.17
[58] Field of Search ............ 192/30 V, 70.17, 106.1, 192/106.2

[56] References Cited

U.S. PATENT DOCUMENTS

| | | | |
|---|---|---|---|
| 2,035,916 | 3/1936 | Pope | 192/106.2 |
| 3,931,876 | 1/1976 | Beeskow et al. | 192/106.2 |
| 4,024,938 | 5/1977 | Maucher | 192/106.2 |
| 4,101,015 | 7/1978 | Radke | 192/106.2 |
| 4,122,931 | 10/1978 | Maucher | 192/106.2 |
| 4,471,863 | 9/1984 | Lech, Jr. | 192/106.2 |
| 4,591,348 | 5/1986 | Takeuchi et al. | 192/106.2 |
| 4,848,552 | 7/1989 | Nishimura et al. | 192/106.2 |

FOREIGN PATENT DOCUMENTS

| | | |
|---|---|---|
| 58-637 | 1/1983 | Japan . |
| 58-5533 | 12/1983 | Japan . |
| 1094762 | 12/1967 | United Kingdom . |
| 2042680 | 9/1980 | United Kingdom . |

Primary Examiner—Rodney H. Bonck
Assistant Examiner—Nicholas Whitelaw
Attorney, Agent, or Firm—Burns, Doane, Swecker & Mathis

[57] ABSTRACT

A clutch disk assembly is provided with a continuously variable hysteresis mechanism which reduces noises or vibrations of the driving system. The continuously variable hysteresis mechanism includes a plate member, a spring member and a friction lining member operably disposed between the hub member and the disk member. The spring member is normally out of contact with said plate member to minimize wear. The spring member and plate member carry first and second projections, respectively, which come into contact after a certain amount of relative rotation occurs between those members, to produce the continuously variable hysteresis between the disk member and the hub member. The plate member is connected to the disk member in a manner preventing relative radial movement therebetween.

8 Claims, 6 Drawing Sheets

CLUTCH DISK ASSEMBLY WITH CONTINUOUSLY VARIABLE HYSTERESIS

BACKGROUND OF THE INVENTION

1. Related Application

This is a continuation-in-part of U.S. application Ser. No. 07/250,747 filed Sept. 29, 1988 and now U.S. Pat. No. 4,903,813.

2. Field of the Invention

This invention relates to a clutch disk assembly having a variable hysteresis mechanism for use in an automotive vehicle.

3. Description of the Related Art

A conventional clutch assembly has a variable hysteresis mechanism which changes the hysteresis at multiple stages of operation. However, a clutch assembly of this type has a flight or series of steps between a first hysteresis stage and a second hysteresis stage and is utilized in a driving system in which noises and vibrations are produced according to variations in engine torque. On the other hand, a traditional clutch disk assembly with a variable hysteresis mechanism is also known which changes the hysteresis in smooth non-stepwise action according to the change of a torsion angle.

As prior art, Japanese Patent Laid-Open Number 58-637 (1983) is shown in FIGS. 9 and 10. In this conventional clutch disk assembly, a cam mechanism comprised of a cam 75d and a cam follower 77d is disposed between a sub plate 75 and a thrust plate (control member) 77, whereby a spring load is varied by the cam mechanism in response to the torsion angle. Namely, the torque-variation transmitted to the sub plate 75 is converted to an axial displacement by the cam mechanism; the axial displacement changes the load of a cone spring 78, thereby increasing or decreasing the hysteresis.

However, in this mechanism, the spring load is always acting on the cam and, due to the sliding movement of the cam the cam is easily abraded. Further, the hysteresis is generated from a low level to a high level by the variable hysteresis, so that when the cam is abraded, the load of the spring 78 changes. As a result, the hysteresis is not uniform.

SUMMARY OF THE PRESENT INVENTION

It is an object of the present invention to provide a clutch disk assembly with a hysteresis mechanism which has a continuously variable hysteresis.

It is another object of the present invention to provide a clutch disk assembly with a hysteresis mechanism in which a cam has improved wear characteristics.

It is still another object of the present invention to reduce noises or vibrations of the driving system which are produced in response to the torque variations of the engine.

In order to accomplished the objects, a clutch disk assembly according to the present invention is provided with a hub member, a disk member and a hysteresis mechanism which is disposed between the hub member and the disk member and which includes a plate member, a spring member and a friction lining member. The plate member, which is connected to the hub member, has a space of constant axial distance in which the spring member is positioned. The spring member is normally out of contact with the plate member. Projections on the plate member and the spring member produce a continuously variable hysteresis torque at a predetermined torotional angle during a stage of relative angular displacement between the plate member and the hub member, during which stage the projections are in contact with one another. The plate is connected to the disk member in such a way that relative radial movement therebetween is prevented; thus no radial friction occurs which can wear those parts.

BRIEF DESCRIPTION OF THE DRAWINGS

These and other objects, features and advantages of the present invention will become fully apparent on reading the following detailed description with reference to the accompanying drawings, wherein like members bear like reference numerals, and wherein.

DETAILED DESCRIPTION OF PREFERRED EMBODIMENTS OF THE INVENTION

Figure 1:
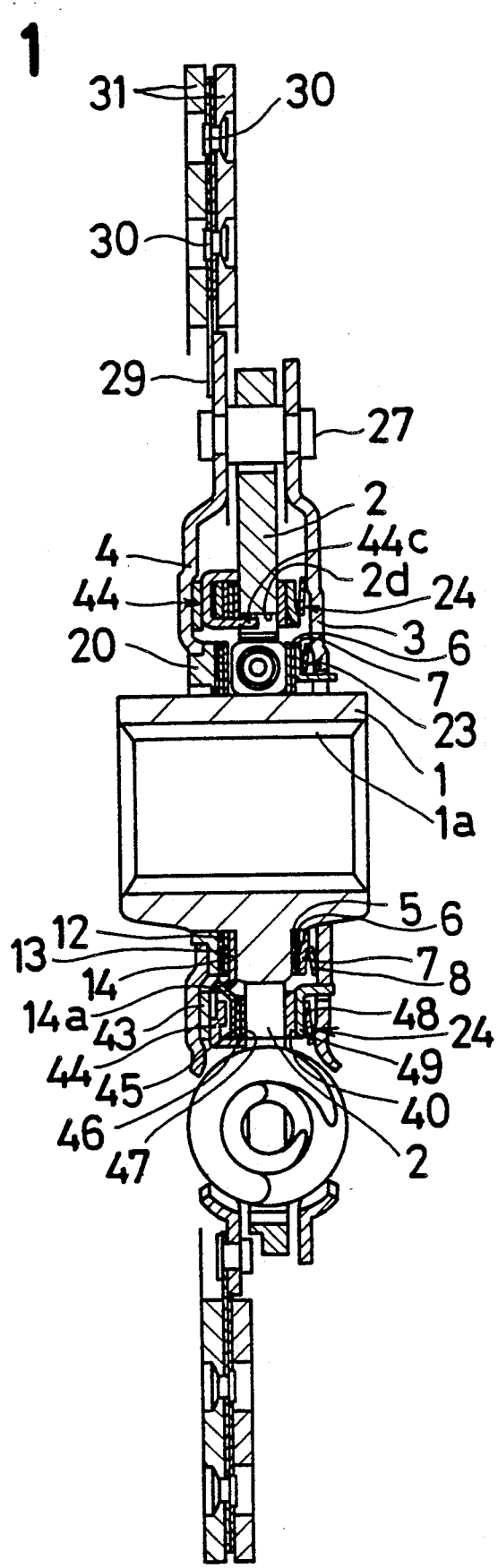
FIG. 1 is an axial sectional view of a clutch disk assembly taken along the line I—I in FIG. 2, illustrating a first embodiment of the present invention.

In a first preferred embodiment of the invention, the clutch disk assembly comprises a hub 1 which is connected to an output shaft (not shown) by a spline 1a. A hub flange 2 is coaxially engaged with the hub 1 and drivably connected thereto by splines 1b and 2b. The splines 1b 2b have a circumferential gap therebetween and are relativelY rotatable through a predetermined angle. Between the hub 1 and the hub flange 2, a radial recess 33 is provided. In the recess 33, a torsion spring 17 is positioned through seats 16, 18 disposed on the flange and hub. When the hub flange 2 is rotated, torque is transmitted from the hub flange 2 to the hub 1 through the torsion spring 17.

Facing plates 29 are fixed on the radially outer side of a disk plate 4, and friction pads 31 are fixed on the both sides of the facing plates 29 by rivets 30. The disk plate 4 is integrally fixed by pins 27 to a sub plate 3 located on the opposite side of the hub flange 2a hysteresis mechanism 23 is positioned between the hub 1 and the plates 3, 4, while a hysteresis mechanism 24 is positioned between the hub flange 2 and the plates 3, 4. A recess 2c is formed on an outer periphery of the hub flange 2 and the pin 27 is circumferentially The hub flange 2, the disk plate 4 and the sub plate 3 are positioned relative to one another as well as interconnected by means of torsion springs 19, 25, 26 interposed in recesses provided in each plate.

The first hysteresis mechanism 23 includes a centering bushing 20, a thrust washer 12, a thrust lining 13 and a washer 14 positioned between the disk plate 4 and the hub 1. A cone spring 8, a thrust plate 7, a thrust lining 6 and a thrust washer 5 complete the first hysteresis mechanism by being positioned between the sub plate 3 and the hub 1.

The second hysteresis mechanism 24 includes a thrust lining 43, an annular cam plate 44, an annular cam spring 45, a thrust plate 46 and a thrust lining 47 positioned between the disk plate 4 and the hub flange 2, a cone spring 48, a thrust plate 49 and a thrust lining 40 complete the second hysteresis mechanism.

Figure 6:
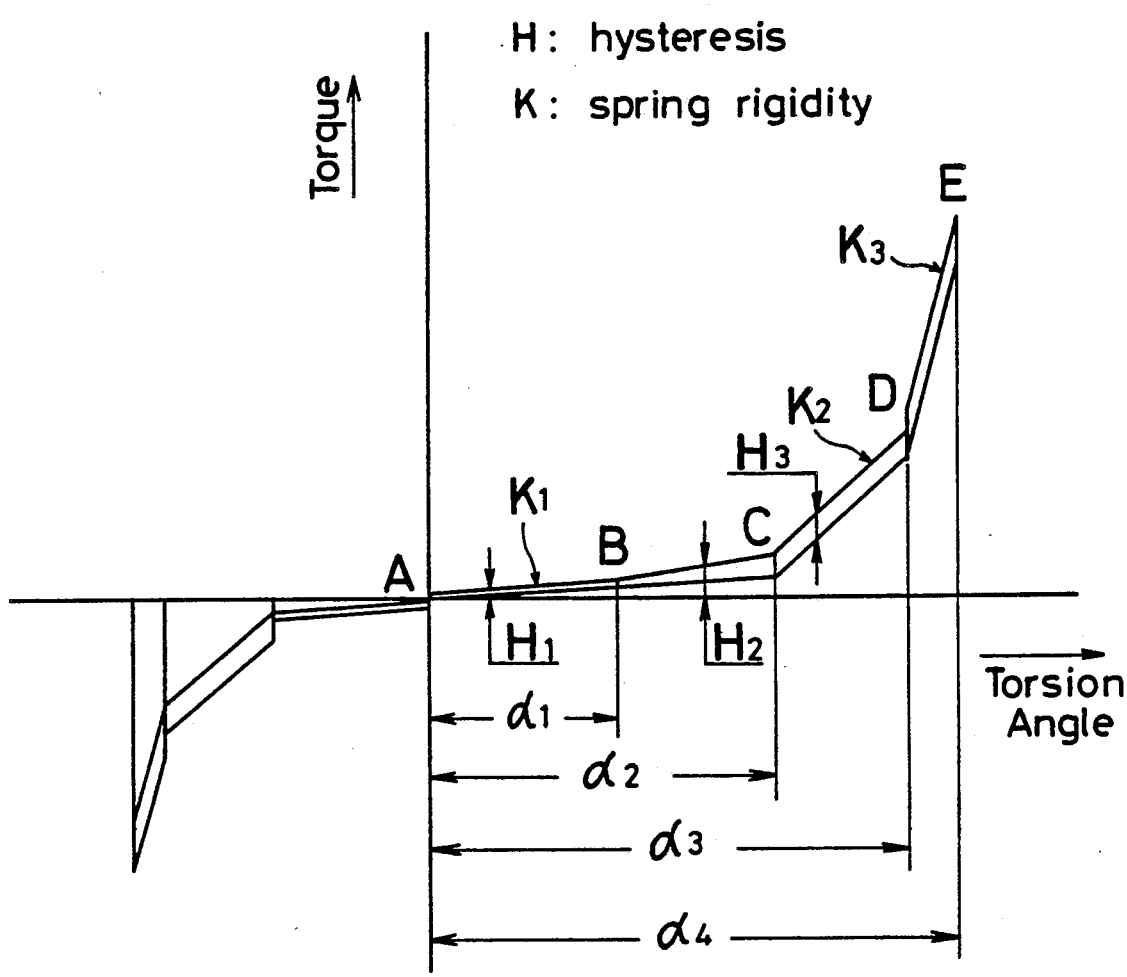
FIG. 6 is a graph of the hysteresis operation of the clutch disk assembly of the present invention.

The first hysteresis mechanism 23 determines the hysteresis in the range of the torsion angle from A to C in FIG. 6, and the second hysteresis mechanism 24 determines the hysteresis in the range of the torsion angle C to E in FIG. 6. A continuously variable hysteresis H2 in proportion to the torsion angle between B and C is shown in FIG. 6.

Figure 3:
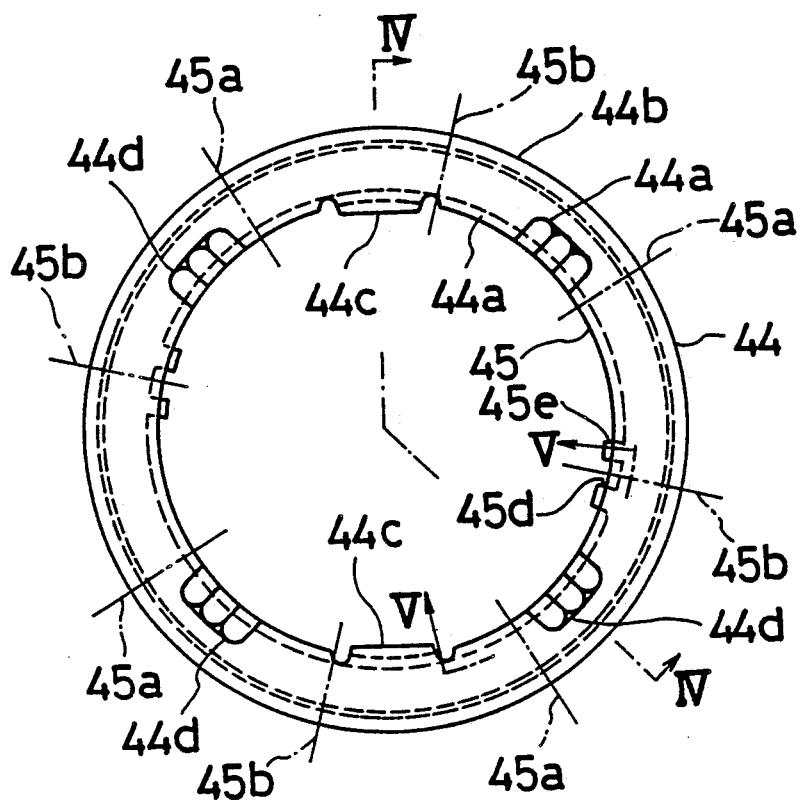
FIG. 3 is a front view of a cam mechanism of the present invention.
Figure 4:
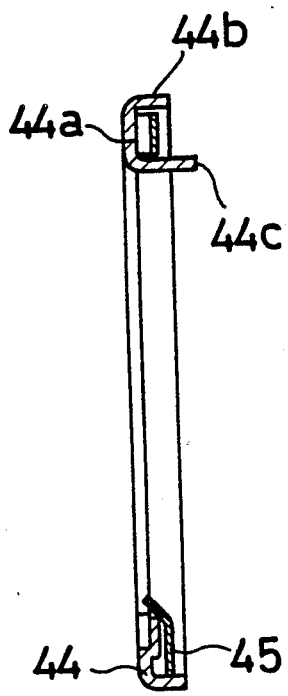
FIG. 4 is a sectional view of a cam mechanism in FIG. 3.
Figure 5:
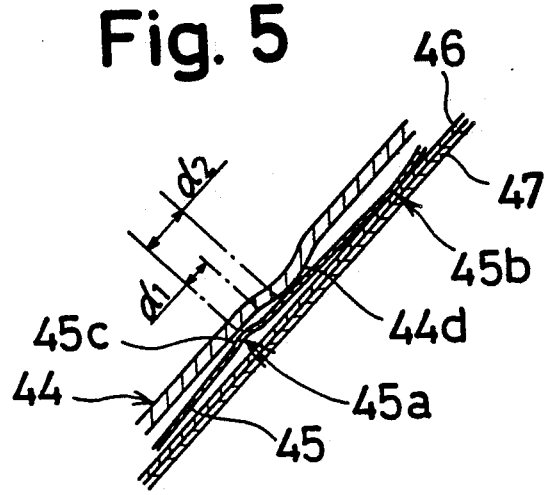
FIG. 5 is a sectional view cam mechanism taken along the line V—V in FIG. 3.

The cam plate 44, which may be formed by an axial pressing process, has a ring shaped flat part 44a, a flange part 44b and protrusions 44c. The flange part 44b is in substantially cylindrical form at an outer peripheral edge of the flat part 44a. The protrusions 44c are formed axially along an inner side of the part 44a. The protrusions 44c are fixedly inserted in recesses 2d formed in the hub flange 2. Therefore, the cam plate 44 is fixed to the hub flange 2 for circumferential movement therewith by the protrusions 44c. On the flat part 44a, four cam projections 44d are circumferentially spaced at equal intervals. Each cam projection 44d is trapezoid-shaped and projects into contact with the cam spring 45. The cam spring 45 is interposed in the space between the flange part 44b and the protrusions 44c. The cam spring 45 is a ring shaped leaf spring of undulating or wavy shape which includes, at circumferentially equal intervals, raised portions 45a and roots or valleys 45b (shown by means of center lines in FIG. 3) defining a substantially undulating form. The raised portions 45a extend toward the cam plate 44 and includes curved follower projections 45c which project toward the cam plate 44. As shown in FIG. 4 and 5, the cam spring 45 is positioned axially interiorly of the cylindrical cam plate 44 such that the convex side of the cam spring 45 is normally spaced from the cam plate 44, and the opposite or concave side of the cam spring 45 engages the thrust plate 46, the latter being connected for common circumferential movement with the cam spring 45 by means of projections (not shown) on the thrust plate 46 which are received in recesses 45d of the cam spring formed by projections 45e. The thrust lining 47 is interposed between the thrust plate 46 and the hub flange 2. A projection 14a (FIG. 1) of the thrust washer 14 of the hysteresis mechanism 23 is engaged in the recess 45d. The amount of hysteresis which is generated by the cam projection and follower projection and applied to the hub flange 2 by the thrust lining 47, is controlled by the spring constant coefficient and the amount of the deflection (according to the shape of the cams) of the spring 45.

Figure 2:
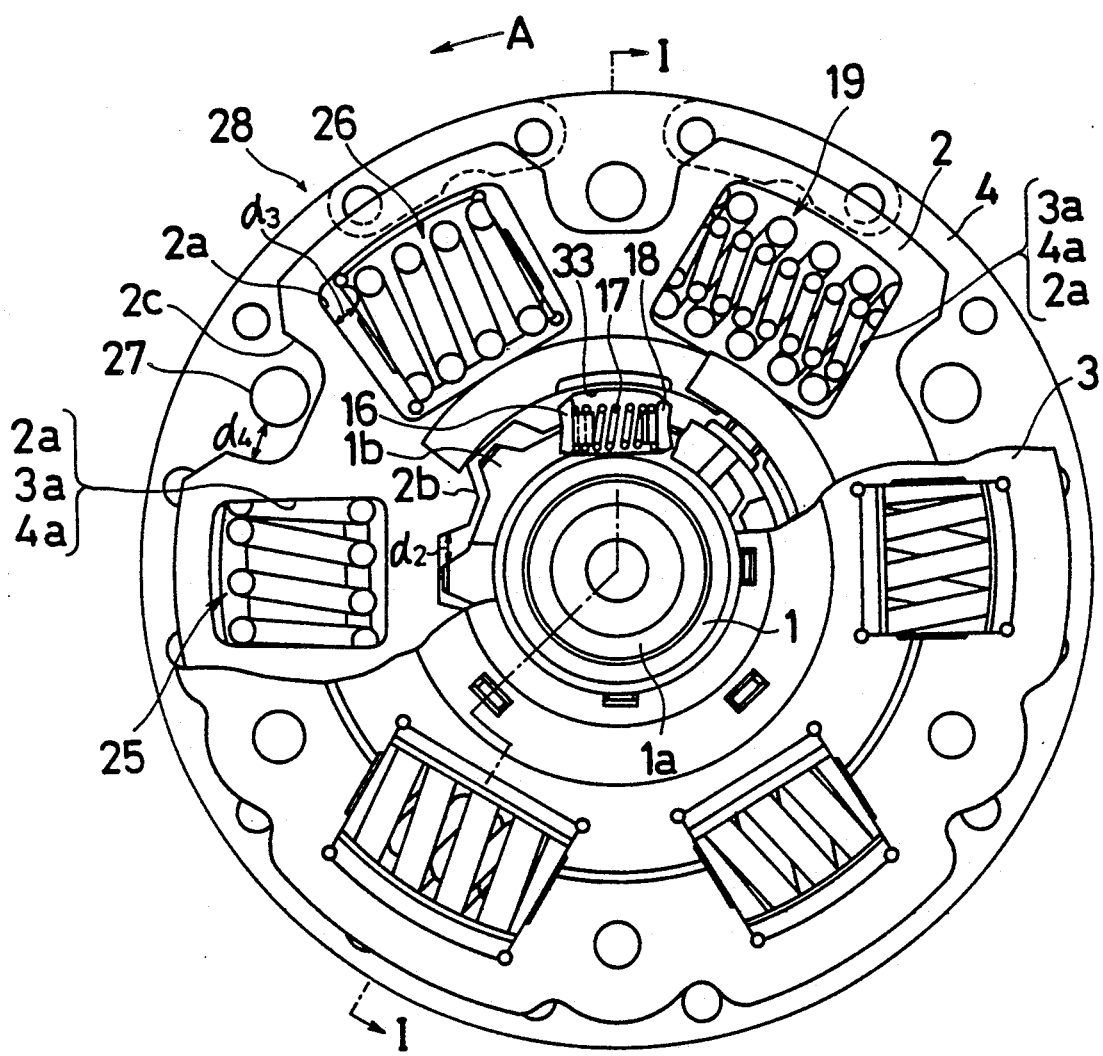
FIG. 2 is a front view and a partially cut-out section of a clutch disk assembly of the present invention.

The torque of the plates 3, 4 in the direction A in FIG. 2 is transmitted to the centering bushing 20, the thrust plate 7, and the thrust linings 13 and 6 of the first hysteresis mechanism 23 to establish the hysteresis torque H1 shown in FIG. 6. When the amount of the input torque is greater than A of FIG. 6, the plates 3, 4 are slidably rotationally moved relative to the hub 1. At that time, torque is transmitted to the hub flange 2 through the plates 3, 4 and the hysteresis mechanism 24 and is further transmitted to the seat 18 by means of the spline 2b to compress the spring 17. In this compressing process the first spring constant coefficient k1 of FIG. 6 is determined according to the spring constant coefficient of the spring 17 as the cam plate 44 moves through an angle $\alpha 1$. The cam spring 45 is fixed to the hub 1 for rotation therewith by the thrust washer 14, 14a; the cam plate 44, which is engaged with the flange 2, is rotated with the hub flange 2. Once the cam plate 44 has moved through the angle $\alpha 1$, the cam projections 44d contact the follower projections 45c. Thereafter, the cam spring 45 begins a deflection process. In this deflection process, the cam projections 44d depress the follower projections 45c, whereupon the cam spring 45 deflects, and a spring load is created in relation to the amount of the deflection. The amount of the deflection increases in relation to the torsion angle; therefore, the spring-load increases in relation to the torsion angle and establishes the continuously variable hysteresis torque H2 between the hub flange 2 and the thrust lining 47, which hysteresis H2 increases in relation to the torsion angle (shown between B and C in FIG. 6). When the cam plate 44 has moved to angle $\alpha 2$, the cam projections 45c contact the peaks of the cam projections 44d, whereby the deflection of the cam spring 45 becomes maximum and the hysteresis torque attains a value H3 at point C. In this position, the spline 1b of the hub 1 is engaged with the spline 2b of the flange 2.

When the input torque further increases past the point C, the plates 3, 4 are slidably moved relative to the hub flange 2, and the input torque is transmitted to the springs 19, 25. During that compression stage (extending to torsion angle $\alpha 3$ in FIG. 6), a second constant spring characteristic k2 is established, the magnitude of which being a function of the rigidity of the springs 19, 25. At the end of this stage (i.e. point D in FIG. 6), one end of the spring 26 is in contact with the recess 2a of the hub flange 2 and, therefore, the input torque is transmitted to the hub flange 2 through the recess 2a. The spring 26 is positioned in the recesses 4a, 3a with a predetermined compression. Thereafter, a third spring characteristic k3 is established according to the spring constant coefficient of the spring 26. At the end of the compression process $\alpha 4$, the pin 27 is contacted with a side of the recess 2c of the hub flange 2. Then, the input torque is transmitted to the hub flange 2 by the pin 27, and the plates 3, 4 are integrally rotated with both the hub 1 and the hub flange 2.

Figure 7:
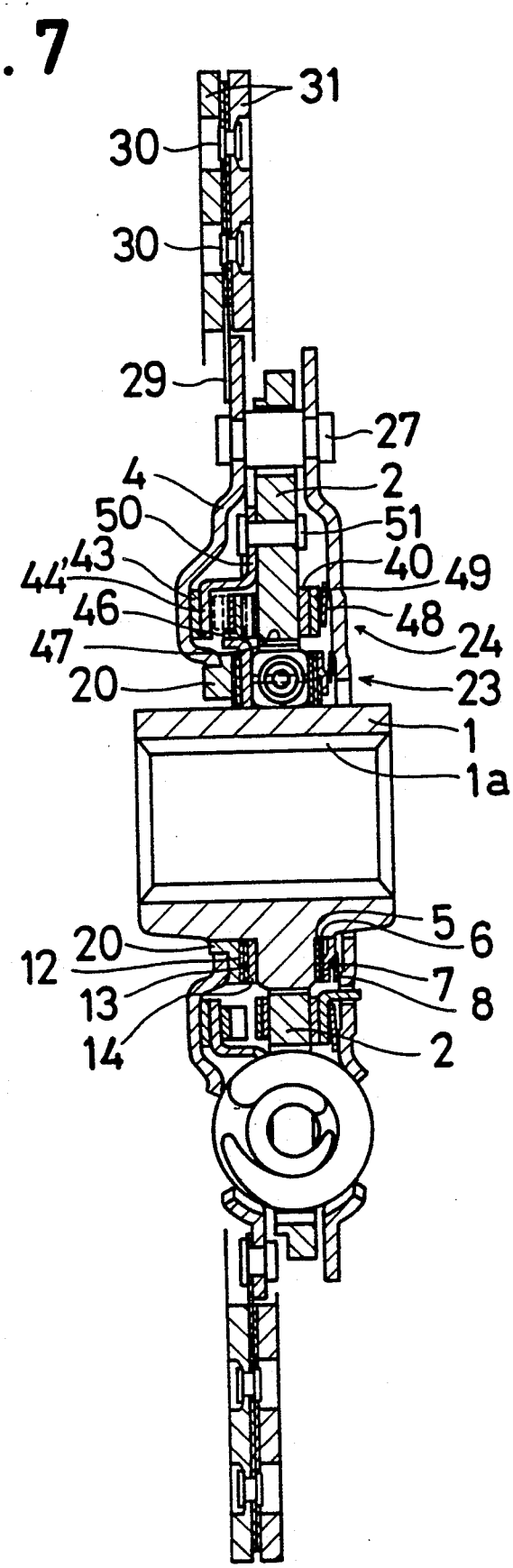
FIG. 7 a sectional view similar to FIG. 1 of a second embodiment of a clutch disk assembly of the present invention.
Figure 8:
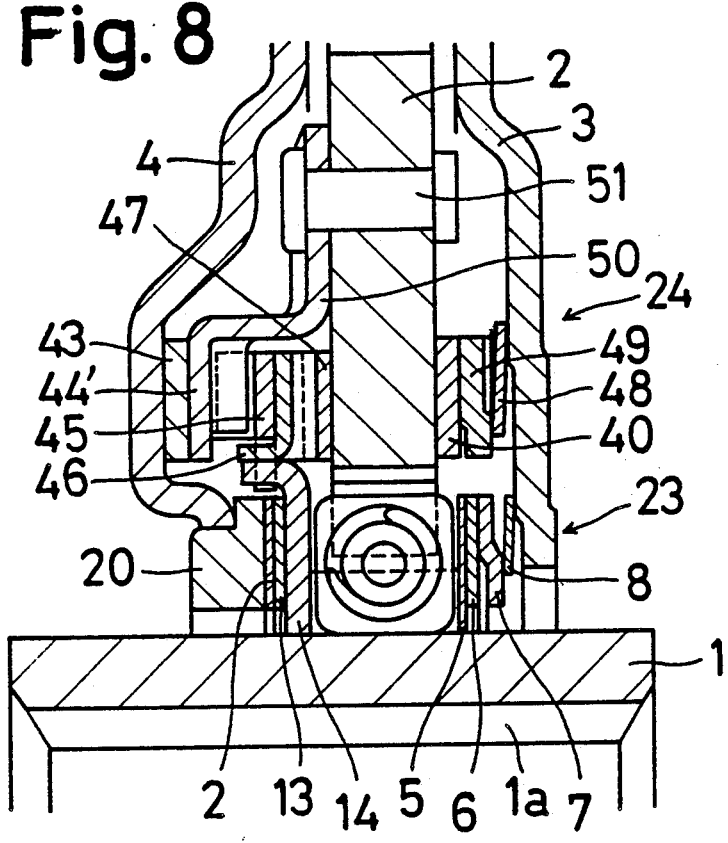
FIG. 8 a sectional view of a hysteresis mechanism in FIG. 7.
Figure 9:
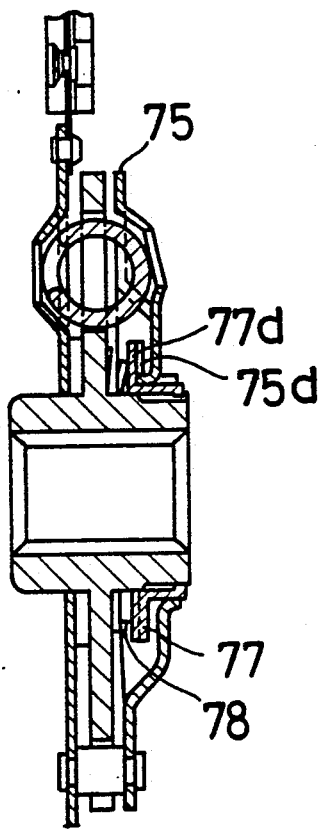
FIG. 9 axial sectional view of a conventional clutch disk assembly.
Figure 10:
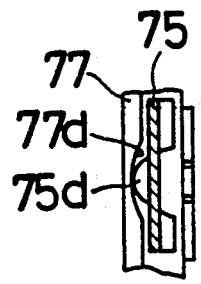
FIG. 10 is a sectional view of conventional clutch disk assembly taken along the line VIII—VIII in FIG. 9.

In a second embodiment, a clutch disk assembly shown in FIG. 7, 8 is of substantially the same construction as that of FIGS. 1–5, except for a shape of the cam plate 44'. The earlier described cam plate 44 is coupled to the hub flange 2 by means of the protrusions 44c. However, it has been found that radial friction can occur between the cam plate 44 and the hub flange 2, and that the load of the cam spring 48 may be transmitted to the cam spring 45 and the thrust lining 47, whereby the resulting hysteresis is not stable. To remedy this, the cam plate 44' of FIG. 7, 8 has a plurality of flange parts 50 lying alongside the side face of the hub flange 2. The flange parts 50 are provided on the outer periphery of the cam plate 44 at equal intervals. Each flange part 50 is connected to the hub flange 2 by a rivet 51. Due to the flange parts 50, there occurs no radial friction between the cam plate 44 and the hub flange 2 and furthermore the load of the cone spring 48 is only transmitted to the thrust plate 49 and thrust lining 40, 43, and is not transmitted to the cam spring 45 and the thrust plate 46 and the thrust lining 47. As a result, a stable hysteresis can be obtained.

The cam mechanism of the invention can be utilized together with conventional hysteresis mechanisms and, therefore, the cam mechanism can be retrofit to provide a continuously variable hysteresis torque in proportion to the torsion angle within a predetermined angle range in existing clutch mechanisms.

The wave leaf spring 45 can easily be adapted to provide the hysteresis characteristic curve according to selected classes of vehicles, and partially the continuously variable hysteresis characteristic curve.

By changing the configuration of the cam face with respect to the spring member and the plate member, and/or by changing the spring constant coefficient of the spring member, the amount of the hysteresis developed can be varied to suit different situations.

Furthermore, in the present invention, the cam plate 44 is not in continuous contact with the cam spring 45, i.e. contact only occurs periodically when the cam projections 44d engage the follower projections 45c, so wear of the parts is minimized, and the spring action will remain uniform.

Although the invention has been described in this preferred form with a certain degree of particularity, obviously many changes and variations are possible therein. It is therefore to be understood that the present invention may be practiced otherwise than specifically described herein without departing from the scope and spirit thereof.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A clutch disk assembly comprising:
   a hub member having means for connection with an output shaft for rotation about an axis;
   a disk member coaxially and rotatably mounted to said hub member and connected to an input shaft;
   a hysteresis mechanism operably connected between said hub member and said disk member for establishing a hysteresis torque therebetween, said hysteresis mechanism including a plate member, a spring member and a friction lining member, said plate member provided with a recess of constant axial length in which said spring member is positioned so as to be normally out of contact with said plate member, said plate member connected to said hub member;
   first and second projections formed on said plate member and said spring member, respectively, and being engageable during a range of relative angular displacement between said plate member and said spring member for generating a continuously variable hysteresis torque; and
   connecting means connecting said plate member to said disk member in a manner preventing relative radial movement therebetween.

2. A clutch disk assembly according to claim 1, where a radially outer side edge of said plate member is of substantially cylindrical shape, and said recess being provided in an axially inner portion of said outer side edge.

3. A clutch disk assembly according to claim 1, wherein said first projection comprises a cam projection formed on said plate member and said second projection comprises a follower projection formed on said spring member and arranged to slidably contact said cam projection.

4. A clutch disk assembly according to claim 2, wherein said first projection comprises a cam projection formed on said plate member and said second projection comprises a follower projection formed on said spring member and arranged to slidably contact said cam projection.

5. A clutch disk assembly according to claim 3, wherein said spring member comprises an annular wave leaf spring.

6. A clutch disk assembly according to claim 4, wherein said spring member comprises an annular wave leaf spring.

7. A clutch disk assembly according to claim 1 wherein said connecting means comprises a plurality of flanges on said plate and rivets fixing said flanges to said disk.

8. A clutch disk assembly comprising:
   a hub member having means for connection with an output shaft;
   a disk member coaxially and rotatably mounted to said hub member and connected to an input shaft;
   a hysteresis mechanism operably connected between said hub member and said disk member for establishing a hysteresis torque therebetween, said hysteresis mechanism including a plate member, a spring member and a friction lining member, said plate member provided with a recess of constant axial length in which said spring member is positioned so as to be normally out of contact with said plate member, said plate member connected to said hub member;
   first and second projections formed on said plate member and said spring member, respectively, and being engageable during a range of relative angular displacement between said plate member and said spring member for generating a continuously variable hysteresis torque.

* * * * *